(12) United States Patent
Bogner et al.

(10) Patent No.: US 11,641,810 B2
(45) Date of Patent: *May 9, 2023

(54) SYSTEM FOR PROVIDING CIRCULATING AIR FOR A VERTICAL GARDENING SYSTEM

(71) Applicant: Vertical Air Solutions LLC, Aptos, CA (US)

(72) Inventors: Matthew Lawrence Bogner, Watsonville, CA (US); James Allen Cunningham, Aptos, CA (US)

(73) Assignee: Pipp Mobile Storage Systems, Inc., Walker, MI (US)

(*) Notice: Subject to any disclaimer, the term of this patent is extended or adjusted under 35 U.S.C. 154(b) by 184 days.

This patent is subject to a terminal disclaimer.

(21) Appl. No.: 16/892,595

(22) Filed: Jun. 4, 2020

(65) Prior Publication Data

US 2020/0288645 A1    Sep. 17, 2020

Related U.S. Application Data

(63) Continuation of application No. 15/730,659, filed on Oct. 11, 2017, now Pat. No. 10,694,682.

(Continued)

(51) Int. Cl.
| | | |
|---|---|---|
| *A01G 9/24* | (2006.01) | |
| *A01G 9/18* | (2006.01) | |
| *A01G 9/20* | (2006.01) | |

(52) U.S. Cl.
CPC ............... *A01G 9/18* (2013.01); *A01G 9/24* (2013.01); *A01G 9/246* (2013.01); *A01G 9/249* (2019.05); *A01G 9/20* (2013.01)

(58) Field of Classification Search
CPC . A01G 7/045; A01G 9/18; A01G 9/24; A01G 9/241; A01G 9/246; A01G 9/249; A01G 9/26; A01G 31/02; A01G 31/06
(Continued)

(56) References Cited

U.S. PATENT DOCUMENTS

| 2,034,995 A | 3/1936 | Sibley |
| 3,307,469 A | 3/1967 | Bohanon |

(Continued)

FOREIGN PATENT DOCUMENTS

| CN | 202738498 | 2/2013 |
| CN | 105830772 | 8/2016 |

(Continued)

OTHER PUBLICATIONS

Video screenshots from "Vertical Farms | Design and Innovation | TakePart", downloaded from https://www.youtube.com/watch?v=KARAIPpNWYI, believed to have been published Aug. 9, 2016.

(Continued)

*Primary Examiner* — Peter M Poon
*Assistant Examiner* — Danielle A Clerkley
(74) *Attorney, Agent, or Firm* — Gardner, Linn, Burkhart & Ondersma LLP

(57) ABSTRACT

Vertical growing uses a plurality of shelves to support plants. The system provides nitrogen and light to help grow the plants placed on the shelves. The system also circulates air that is filtered and mixed with the nitrogen before being distributed to the plants. The filters can remove odors from the circulating air.

33 Claims, 8 Drawing Sheets

Related U.S. Application Data

(60) Provisional application No. 62/549,919, filed on Aug. 24, 2017.

(58) Field of Classification Search
USPC .................................. 47/17, 19.2, 29.5, 39
See application file for complete search history.

(56) References Cited

U.S. PATENT DOCUMENTS

| | | | |
|---|---|---|---|
| 3,348,922 A | 10/1967 | Bose et al. | |
| 3,474,720 A | 10/1969 | Qualley et al. | |
| 3,648,591 A | 3/1972 | Winnett | |
| 3,810,327 A | 5/1974 | Giansante | |
| 3,956,852 A | 5/1976 | Ceausescu et al. | |
| 4,030,518 A | 6/1977 | Wilcox | |
| 4,292,762 A | 10/1981 | Fogg et al. | |
| 4,505,066 A | 3/1985 | Moore | |
| 4,589,476 A | 5/1986 | Berner | |
| 5,358,444 A | 10/1994 | Helm et al. | |
| 5,493,808 A | 2/1996 | Munday | |
| 5,746,653 A | 5/1998 | Palmer et al. | |
| 6,205,704 B1 | 3/2001 | Schmitz et al. | |
| 6,578,319 B1 | 6/2003 | Cole et al. | |
| 8,448,379 B2 | 5/2013 | Igarashi | |
| 8,468,741 B2 | 6/2013 | Lewis | |
| 9,010,019 B2 | 4/2015 | Mittelmark | |
| 9,161,498 B1 | 10/2015 | Shelor | |
| 9,241,453 B1 | 1/2016 | Martin et al. | |
| 9,480,207 B2 | 11/2016 | Tanase et al. | |
| 9,974,252 B2 | 5/2018 | Aykroyd et al. | |
| 10,058,041 B2 | 8/2018 | Hanzawa et al. | |
| 10,292,346 B2 | 5/2019 | Gallant | |
| 10,306,847 B2 | 6/2019 | Whitcher et al. | |
| 10,477,779 B2 | 11/2019 | Hutzel | |
| 10,602,677 B2 | 3/2020 | Gomi | |
| 10,667,472 B2 | 6/2020 | Muanchart | |
| 10,674,680 B2 | 6/2020 | Hutto | |
| 10,694,682 B2 | 6/2020 | Bogner et al. | |
| 10,806,099 B2 | 10/2020 | Bogner et al. | |
| 10,866,886 B2 | 12/2020 | Millar | |
| 2004/0194371 A1 | 10/2004 | Kinnis | |
| 2004/0251122 A1 | 12/2004 | Goswami | |
| 2008/0086981 A1 | 4/2008 | Kilkis et al. | |
| 2008/0172935 A1 | 7/2008 | Feng | |
| 2010/0126063 A1 | 5/2010 | Emoto | |
| 2010/0275512 A1 | 11/2010 | Nien | |
| 2011/0192082 A1 | 8/2011 | Uchiyama | |
| 2011/0302838 A1 | 12/2011 | Chen et al. | |
| 2012/0311926 A1 | 12/2012 | Mittelmark | |
| 2013/0000185 A1 | 1/2013 | Tanase et al. | |
| 2013/0305601 A1 | 11/2013 | Park | |
| 2014/0112648 A1 | 4/2014 | Reinders et al. | |
| 2014/0260131 A1 | 9/2014 | Burkhauser | |
| 2014/0318012 A1 | 10/2014 | Fujiyama | |
| 2015/0007495 A1 | 1/2015 | Tseng et al. | |
| 2015/0230416 A1 | 8/2015 | Lo | |
| 2016/0007544 A1 | 1/2016 | Takashima et al. | |
| 2016/0057944 A1 | 3/2016 | Smits et al. | |
| 2016/0157447 A1 | 6/2016 | Hanzawa et al. | |
| 2016/0242372 A1 | 8/2016 | Wong et al. | |
| 2016/0324089 A1 | 11/2016 | Miyabe et al. | |
| 2017/0142912 A1 | 5/2017 | Gasmer et al. | |
| 2018/0035624 A1 | 2/2018 | Itoh et al. | |
| 2018/0125016 A1 | 5/2018 | Dufresne | |
| 2018/0213735 A1 | 8/2018 | Vail et al. | |
| 2018/0368336 A1 | 12/2018 | Erickson et al. | |
| 2019/0059241 A1 | 2/2019 | Bogner et al. | |
| 2019/0059242 A1 | 2/2019 | Bogner et al. | |
| 2019/0261587 A1 | 8/2019 | Abe et al. | |
| 2019/0289794 A1 | 9/2019 | Matsumura et al. | |
| 2020/0214228 A1 | 7/2020 | Cho et al. | |
| 2020/0396909 A1 | 12/2020 | Bogner et al. | |

FOREIGN PATENT DOCUMENTS

| | | | |
|---|---|---|---|
| JP | 2009-273481 | 11/2009 | |
| JP | 5696848 | 3/2013 | |
| JP | 2013051942 | 3/2013 | |
| JP | 2013188190 | 9/2013 | |
| JP | 2014-014285 | 1/2014 | |
| JP | 5696848 B2 * | 4/2015 | ............. A01G 31/06 |
| JP | 2016-208948 | 12/2016 | |
| JP | 2016202110 | 12/2016 | |
| JP | 2017127302 | 7/2017 | |
| KR | 20010095493 | 11/2001 | |
| KR | 20030027362 | 4/2003 | |
| KR | 20070117035 | 12/2007 | |
| KR | 101222399 | 1/2013 | |
| KR | 101531385 | 6/2015 | |
| KR | 20150003480 U * | 9/2015 | ............. A01G 7/045 |
| KR | 20160111766 | 9/2016 | |
| WO | 2011028100 | 3/2011 | |
| WO | 2013170361 | 11/2013 | |
| WO | WO 2017/024079 | 2/2017 | |
| WO | 2018135296 | 7/2018 | |
| WO | WO 2019/040863 | 2/2019 | |

OTHER PUBLICATIONS

Petition for Inter Partes Review of U.S. Pat. No. 10,806,099, Case No. IPR2022-00893, filed Apr. 19, 2022.
Corrected Petition for Inter Partes Review of U.S. Pat. No. 10,806,099, Case No. IPR2022-00893, filed May 4, 2022.
Broz, William R., Declaration on Invalidity of U.S. Pat. No. 10,806,099, Case No. IPR2022-00893, dated Apr. 19, 2022.
Decision Granting Institution of Inter Partes Review, Case No. IPR2022-00893, dated Oct. 27, 2022.
2013 ASHRAE Handbook—Fundamentals, pp. 21.18-21.19.
2015 ASHRAE Handbook—Heating, Ventilating, and Air-Conditioning Applications, pp. 8.4, 24.10, 24.14, 60.1.
2016 ASHRAE Handbook—Heating, Ventilating, and Air-Conditioning Systems and Equipment, pp. 4.12, 20.5.
Office Action dated Jul. 1, 2022 in co-pending and commonly-owned U.S. Appl. No. 17/012,322.
Chris Beytes, Ed., "Ball Redbook Greenhouses and Equipment, vol. 1," Ball Publishing, 18th Edition, 2011.
TRANE Catalog "Performance Climate Changer Air Handlers Sizes 3-120 Indoor and Outdoor Units Application and Performance Information," document is labeled with a date of Sep. 2013.
Carrier, "Comfort Multi-family Hom Fan Coil FMA4," document is labeled with a copyright date of 2022, and is understood to have been downloaded on or about Apr. 12, 2022.
Hengda Perforated Metal Factory, "Perforated Ducting," document is undated, and is understood to have been downloaded on or about Apr. 12, 2022.

* cited by examiner

SYSTEM FOR PROVIDING CIRCULATING AIR FOR A VERTICAL GARDENING SYSTEM

CROSS REFERENCE TO RELATED APPLICATIONS

This application is a continuation of U.S. patent application Ser. No. 15/730,659 filed Oct. 11, 2017, (now U.S. Pat. No. 10,694,682), which claims priority to US Provisional Patent Application No. 62/549,919, "System And Method For Providing Carbon Dioxide And Circulating Air For A Vertical Gardening System" filed Aug. 24, 2017, the contents of each of which is hereby incorporated by reference.

BACKGROUND OF THE INVENTION

Vertical farming is the practice of producing food and medicine in vertically, stacked layers, vertically inclined surfaces and/or integrated in other structures such as warehouses and other structures that can accommodate growing plants. Vertical farming use indoor farming techniques and controlled-environment agriculture (CEA) technology, where all environmental factors can be controlled. These facilities utilize artificial control of light and watering. Prior methods for circulating air are accomplishing using wall mounted oscillating fans and ceiling mounted HVAC systems. However, this air circulation method is ineffective in a vertical growing configuration and most vertical gardens are too compact for these environmental control methods to be efficient.

Prior methods for carbon dioxide dispersion use piping a plastic line to the back of a wall mounted fan or a carbon dioxide generator mounted at the ceiling in the room. Both methods do not allow for a controlled direction of carbon dioxide. Prior methods of filtering air have been through large "can filters" attached to a fan on the intake side. However, these large can filters occupy a large volume of space. What is needed is system which improves the circulation of air, improves the distribution of carbon dioxide, and uses smaller filters that occupy less space.

SUMMARY OF THE INVENTION

The present invention is directed towards a system and method for circulating air and carbon dioxide and providing light to a vertical gardening system. Traditional methods of wall mounted fans do not properly circulate air. The present invention eliminates the problem of stagnant air pockets created in indoor vertical farming where space is limited. The present invention also disburses carbon dioxide directly onto each row of crops growing on a different shelf of a rack assembly. This process insures that each plant receives an equal quantity of carbon dioxide, as opposed to common methods of releasing carbon dioxide into a large general area with non-uniform distribution. The invention also provides a compact air filtration system, eliminating the need for large can filters commonly used.

The new invention differs from traditional methods by having the filters on the supply side of an air circulation system. This allows for the air coming out of the fan to be disrupted, eliminating the spiral motion and pressurizes the low profile duct evenly on either side. The inventive system creates air movement inside each rack of plants where wall fans can't reach and space does not allow for. The new invention allows carbon dioxide to be plumbed into the plenum and dispersed directly to the plants. The new invention utilizes fan or fans with a filter to clean the air as well as circulating the air. This allows for less space to be used, lower energy costs, and the benefit of being able to change disposable filters more often at a much lower cost than "can filters".

DETAILED DESCRIPTION OF THE INVENTION

The inventive system can be used with a vertical plant growing system to disperse carbon dioxide gas to a plurality of stacked shelves that are arranged vertically in a rack placed in a room or a building. A carbon dioxide distribution system can be mounted over each shelf of the rack so several carbon dioxide distribution systems can be used with each rack. The carbon dioxide distribution system can perform various functions including: circulate air around each of the plants, provides an even distribution of carbon dioxide to each of the plants and filters the recirculating air. A lighting system can also be attached to the bottom of the carbon dioxide distribution system that can provide continuous grow light exposure to the plants.

Figure 1:
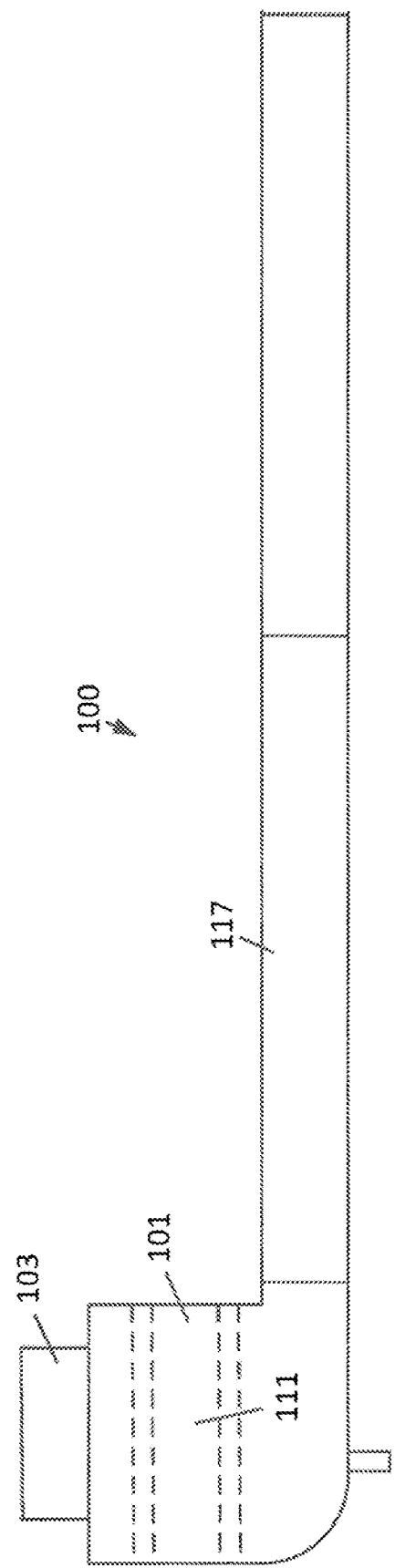
FIG. 1 illustrates is a side view of an embodiment of the carbon dioxide distribution system.
Figure 2:
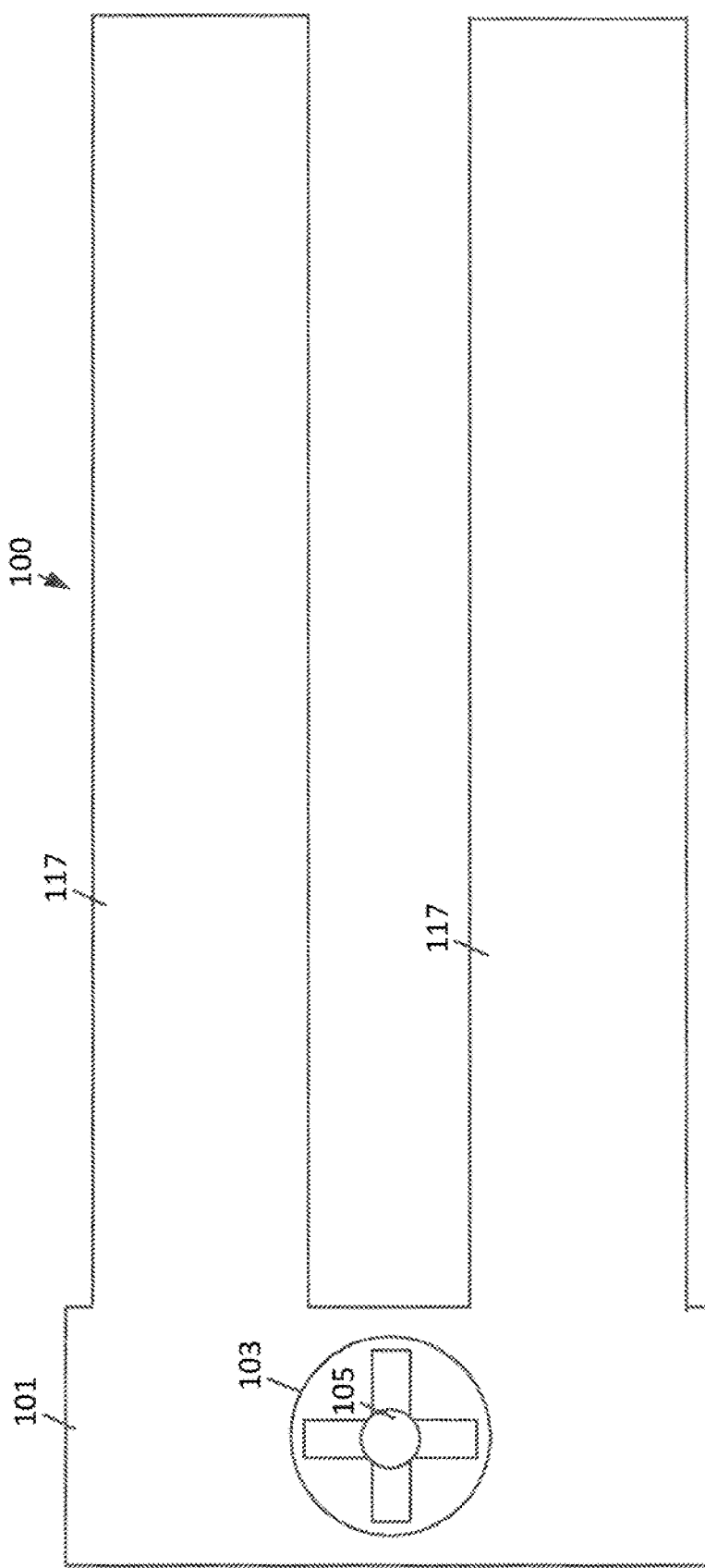
FIG. 2 illustrates a top view of an embodiment of the carbon dioxide distribution system.

With reference to FIG. 1, a side view of an embodiment of the carbon dioxide distribution system 100 is illustrated and with reference to FIG. 2, a top view of an embodiment of the carbon dioxide distribution system 100 is illustrated. Air can be directed into an intake collar 103 mounted on an inlet portion of a filter housing 101. In an embodiment, a fan 105 can be used to push the air into the intake collar 103. The air can enter the filter housing 101 and flow through one or more filters 111. The filtered air can then flow into a plenum. A carbon dioxide gas inlet 113 can be coupled to the plenum and the carbon dioxide can be mixed with the filtered air. The carbon dioxide and air mixture can then flow into one or more elongated ducts 117 via respective outlet portions of the housing 101. Each duct 117 has a plurality of holes on a lower surface and the end of the duct 117 can be sealed with an end cap. The elongated ducts 117 are positioned above a plurality of plants on each shelf of the rack assembly. The carbon dioxide and air flow through the holes onto the plants, which absorb the carbon dioxide.

With reference to FIG. 2, in an embodiment, the fan 105 can be a 10" or a 6" to 14" inline fan 105 that can be mounted in the intake collar 103 at the top of the filter housing 101. The inventive system can be used with various types of vertical rack systems with plants positioned on each shelf of the rack system. The fan 105 can be mounted outside of the pallet rack volume on an end of the pallet rack. In an embodiment, the fan 105 flow rate can output 1,000 cubic feet per minute (CFM). In other embodiments, any other airflow mechanism can be used with the carbon dioxide distribution system to drive air through the system.

Figure 3:
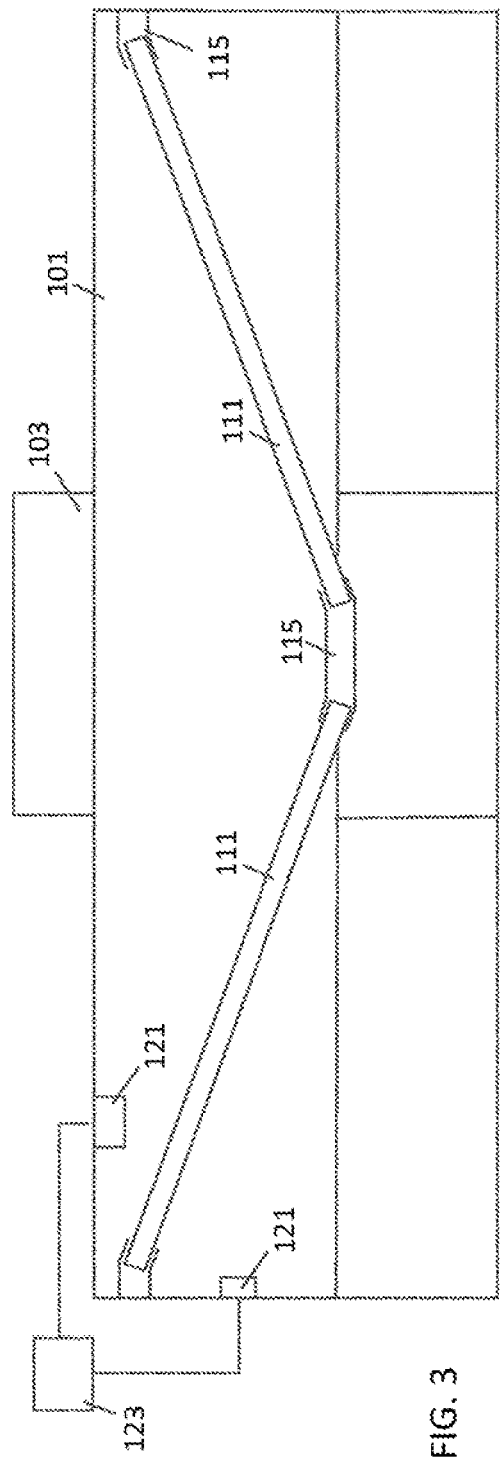
FIG. 3 illustrates a front section view of an embodiment of the air intake portion of the carbon dioxide distribution system.
Figure 4:
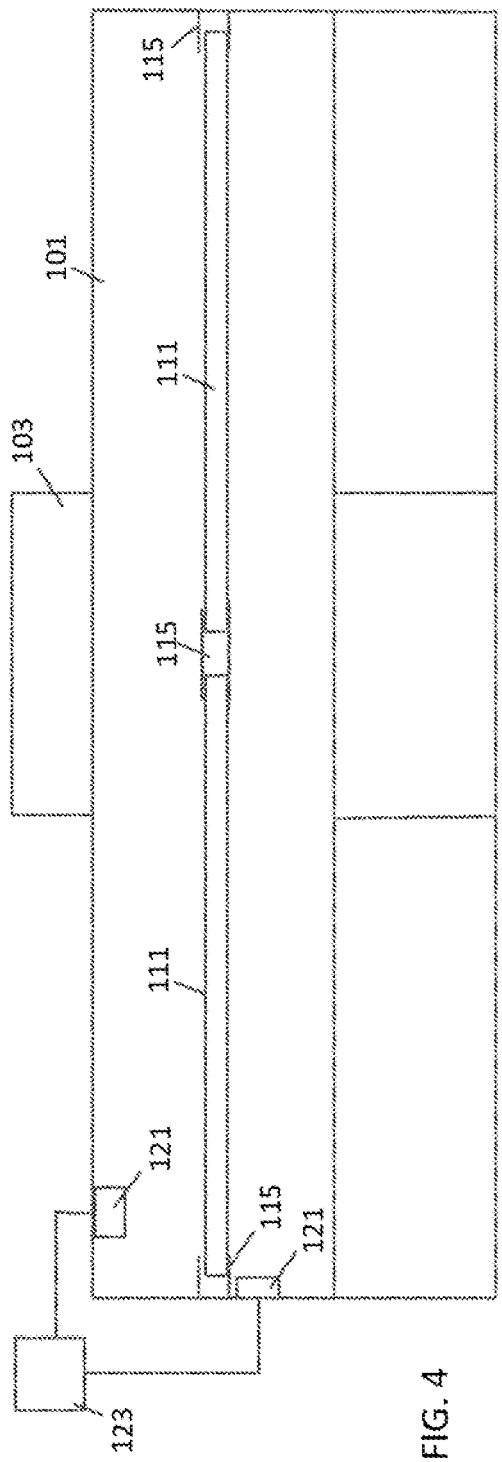
FIG. 4 illustrates a front section view of another embodiment of the air intake portion of the carbon dioxide distribution system.
Figure 5:
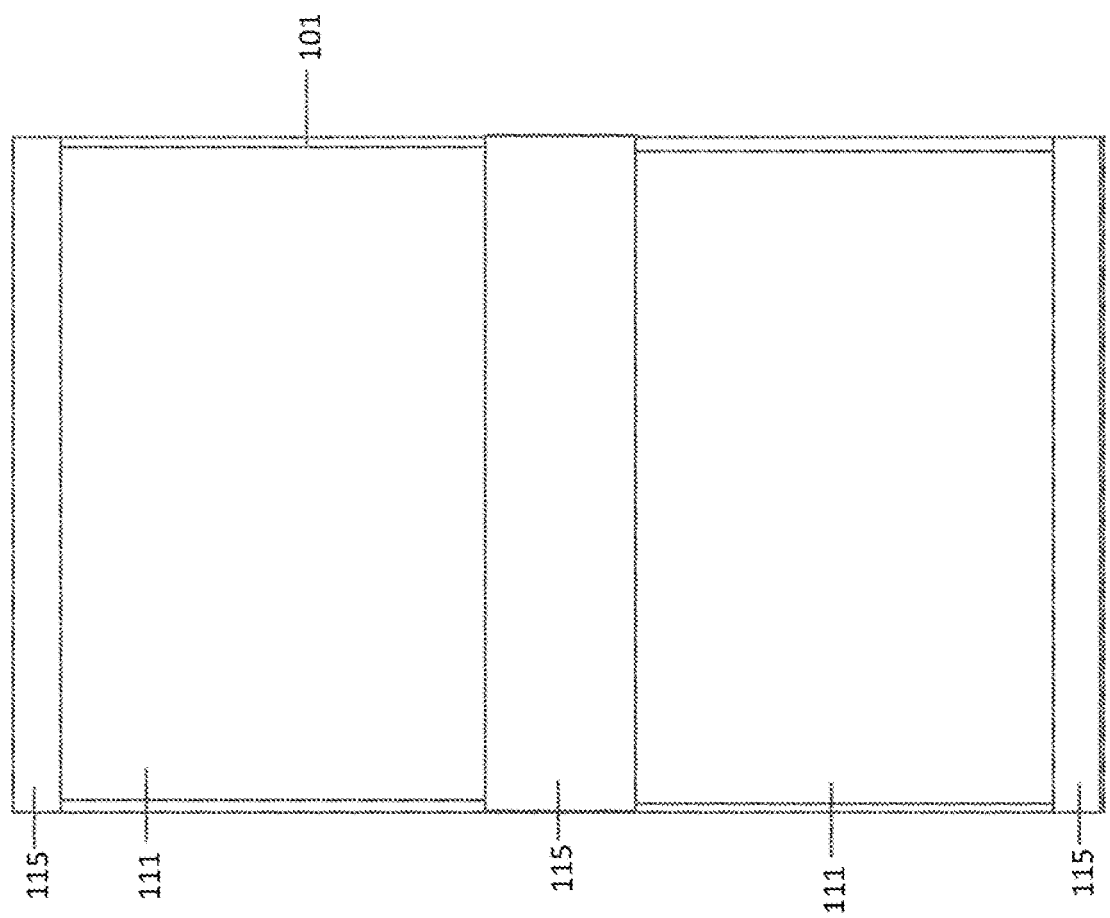
FIG. 5 illustrates a top section view of an embodiment of the air intake portion of the carbon dioxide distribution system.

With reference to FIG. 3, a cross section front view of an embodiment of the filter housing 101 is illustrated. In this embodiment, there are two filters 111 that are held in angled positions by channel brackets 115. With reference to FIG. 4, another cross section front view of an embodiment of the filter housing 101 is illustrated. In this embodiment, there are two filters 111 that are held in flat positions by the channel brackets 115. Air flows through the center portions of the filters 111 so the brackets 115 only contact the edges of the filters 111. In other embodiments, the filters 111 can be held by any other holding mechanisms. With reference to FIG. 5 a top sectional view of an embodiment of the filter housing 101 illustrated. A fan can be mounted within the intake collar 103 which can be attached to the air inlet on top of the filter housing 111. The fan can blow air into the filter housing 101 and through the filters 111.

With reference to FIGS. 3-5, the filters 111 can be mounted across the width of the filter housing 101 so that air from the inlet must flow through one of the filters 111. In this example, a first filter 111 is on one side of the filter housing 101 and a second filter 111 is on an opposite side of the filter housing 101. In an embodiment with reference to FIG. 3, the filters 111 can be angled rather than horizontally oriented within the filter housing. The edge of the filters 111 at the center of the filter housing 101 can be lower than the edges of the filters 111 at the outer sides of the filter housing 101. The filters 111 can be mounted on support structures which can be channel brackets 115 that extend across the length of the filter housing 101. In an embodiment, the support structures channel brackets 115 can have grooves that securely hold the inner and outer edges of the filters 111 in place within the filter housing 101. The filter housing 101 can have a hinged door that can be open to access the filters 111. The filters 111 can be removed and replaced when the hinged door is opened and the filters 111 can be locked in place within the filter housing 101 when the hinged door is closed.

The filters 111 can trap particulates from the plants, which can be beneficial when the plants being grown are very aromatic. Terpenes are a group of organic molecules derived from isoprene that are present in fruits, vegetables and vegetation. Terpenes are derived biosynthetically from units of isoprene and the basic molecular formula is $(C_5H_8)$. These terpenes cause the specific odours for example: limonene in citrus fruit, pinene in pine tree. Marijuana is also a plant that produces terpenes. Because the smell of terpenes can be a nuisance to the surrounding areas, it can be highly beneficial to remove the marijuana terpenes that have been released into the air by the cannabis plants. In an embodiment, the filters used with the system can be terpene filters that remove terpenes from the circulating air in the plant grow building. By removing terpenes from the air, the odor generated by the building where the plants are grown can be greatly reduced so that the building is not a nuisance to the surrounding community. When the terpenes saturate the filters 111, the door to the filter housing 101 can be opened and the filters 111 can be removed and replaced with clean filters 111. The used filters 111 can be placed in sealed bags so that the odors are contained.

When the air enters the plenum through the fan 105, the air must passes through the air filters 111. In an embodiment, the filters 111 can have the dimensions, 12"×20"×1". This process disrupts the spiraling air flow created by the fan 105 and allows both sides of the supply runs to pressurize and distribute even amounts of air through the 1.125" duct exit holes. This was unachievable with a direct fan to supply run configuration. The process also eliminates the need for a separate fan and carbon filter to be installed in the room.

In an embodiment, a pressure sensor(s) 121 can be mounted in the filter housing 101 to measure static pressure and a differential pressure across the filters 111. This information can be used to determine the flow resistance through the filter 111 and the flow rate through the system. If a first pressure sensor 121 is mounted in the filter housing 101 upstream of the filter 111 and a second pressure sensor 121 is mounted in the filter housing 101 downstream of the filter 111, the differential pressure across the filters 111 can be measured. A clean filter 111 will allow air to more easily flow through the filter 111 and will have a lower differential pressure than a dirty filter 111. In an embodiment the system can have a processor 123 that is coupled to the pressure sensors 121 that monitor the differential pressure and the processor 123 can issue notifications when the differential pressure exceeds a predetermined value. The operator will then know that the filter(s) 111 need to replaced.

In another embodiment, the system sensor 121 and processor 123 can monitor the static pressure of the pressure up stream of the filter 111. This monitoring system can depend upon the air input providing a constant power or flow rate into the system. As the filter(s) 111 becomes dirty, the static pressure upstream of the filter(s) 111 will increase and when the upstream static pressure exceeds a predetermined value, the monitoring system can inform the operator who will then know that the filter(s) 111 need to replaced. Conversely, the system can monitor the static pressure of the pressure down stream of the filter(s) 111. As the filter(s) 111 becomes dirty, the static pressure downstream of the filter 111 will decrease and when the down stream static pressure falls below a predetermined value, the monitoring system can inform the operator who will then know that the filter(s) 111 need to replaced.

Figure 6:
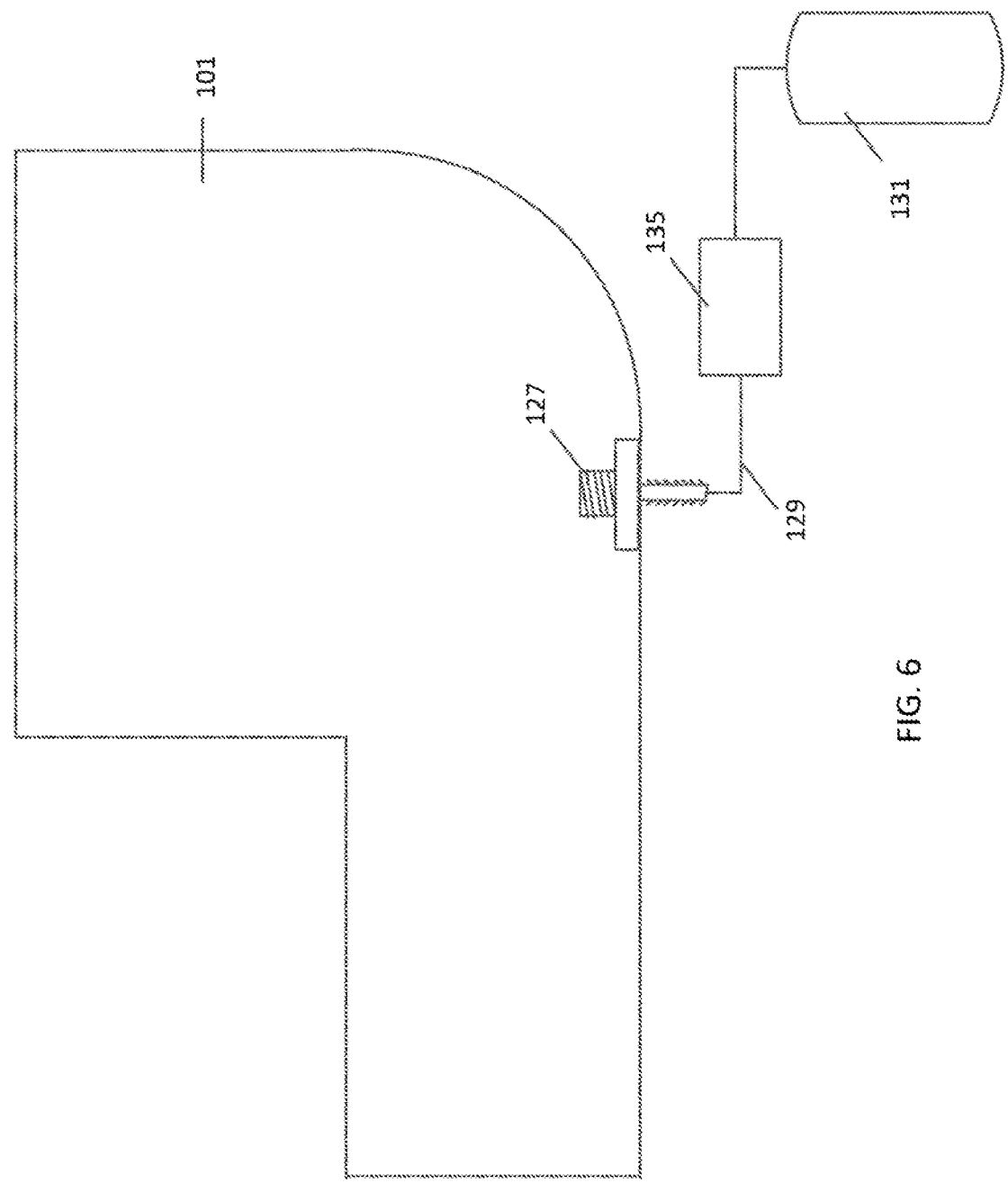
FIG. 6 illustrates a side section view of an embodiment of the air intake portion of the carbon dioxide distribution system.

With reference to FIG. 6, a side sectional view of the filter housing 101 is illustrated showing the carbon dioxide inlet 127 coupling attached to the bottom of the filter housing 101. The carbon dioxide inlet 127 in the illustrated example, can have a threaded insert which is bolted to the inner surface filter housing 101 which forms a seal with the filter housing 101 and prevents carbon dioxide gas leakage. An inlet coupling 127 extends from the filter housing 101. In an embodiment, the inlet coupling 127 can be a nipple which can be coupled to tubing 129 that can be used to deliver carbon dioxide to the filter housing 101. The carbon dioxide inlet coupling 127 can be coupled with tubing 129 to a carbon dioxide gas source 131 such as a carbon dioxide tank or other carbon dioxide supply. In an embodiment, a control valve 135 can be coupled between the carbon dioxide gas source 131 and the filter housing 101. The control valve 135 can be coupled to a carbon dioxide controller which can monitor the carbon dioxide levels in the building or at the plant levels. The carbon dioxide controller can maintain a predetermined carbon dioxide level by decreasing the carbon dioxide flow when the detected carbon dioxide level is too high and increase the carbon dioxide flow when the detected carbon dioxide level is too low.

Figure 7:
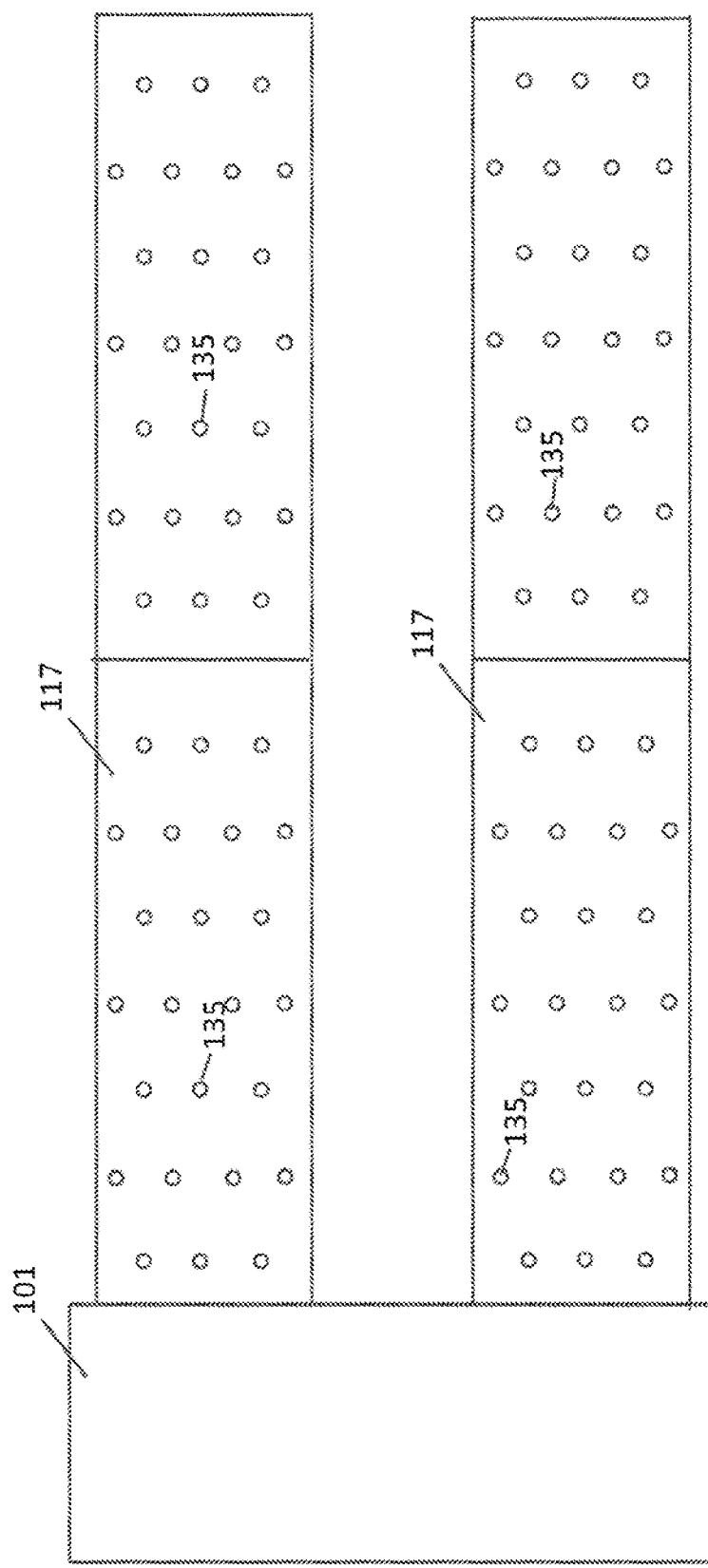
FIG. 7 illustrates a bottom view of an embodiment of the carbon dioxide distribution system.

With reference to FIG. 7, a bottom view of an embodiment of distribution ducts 117 of the carbon dioxide distribution system 100 is illustrated. Air and carbon dioxide flow through the ducts 117 from the proximal end attached to the filter housing 101 to the distal end of the ducts 117. The air and carbon dioxide will flow out of the holes 135 on the bottom of the ducts 117. In an embodiment, the holes 135 can be 1.125 inch diameter holes. However, in other embodiments, the holes 135 can be any suitable size such as 0.5 inch to 2.0 inch diameters.

The distribution ducts 117 can be a metal duct system made from aluminum or galvanized sheet metal. The distribution ducts 117 can be designed to be as thin as possible while still providing desired flow rate of carbon dioxide and velocity of air movement over a vertical gardening application. This can be accomplished by using a thin cross section distribution duct 117 so that the ducts consume very little vertical space. For example, the ducts 117 can have a cross section that is about 3 inches high and about 16 inches wide. This height to width (H/W) ratio can be known as the aspect ratio. In this example, the aspect ratio is 3/16=0.1875. In an embodiment, the aspect ratio of the ducts 117 is less than 0.25. The flow rate of the air and carbon dioxide can be quantified with a flow rate metric such as cubic feet per minute (CFM). The carbon dioxide and airflow eliminates warm pockets of air by providing concentrated air movement, carbon dioxide dispersion, and filtration.

Figure 8:
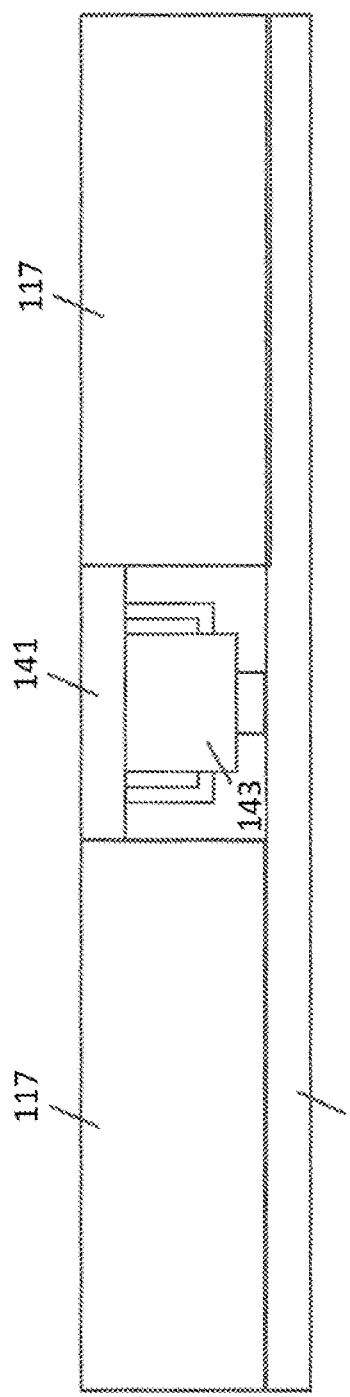
FIG. 8 illustrates a front view of an embodiment of the light ballast, light bar and carbon dioxide distribution ducts.

In addition to providing carbon dioxide to the plants on the rack system, embodiments of the present invention incorporate grow lights that emit light that is directed towards the plants. With reference to FIG. 8, a front view of an embodiment of the carbon dioxide distribution ducts 117 and grow light bar 145 used with the carbon dioxide distribution system 100 is illustrated. The grow light components can include a light ballast 143, a heat sink 141 and light bars 145 which hold a plurality of light emitting diodes (LEDs). Electrical power such as 110V AC or 220V AC is supplied to the light ballasts 143, which provide the required electrical power to the LED grow lights in the light bars 145. The ballasts 143 can limit the amount of current from supply line voltage, while maintaining the necessary electrical conditions for proper lamp start and operation. In this embodiment, the ballast 143 can be mounted under the lower surfaces of the air ducts 117. The ducts 117 can in physical contact with the light bars 145 and the ballasts 143. The ducts 117 can function as heat sinks for heat generated by the light bars 145 and the ballast 143. The ducts 117 can be dissipate the heat from the ballasts 143 and the light bars 145 to prevent over heating. Similarly, the heat sink 141 can help to dissipate the heat generated by the ballasts 143.

Figure 9:
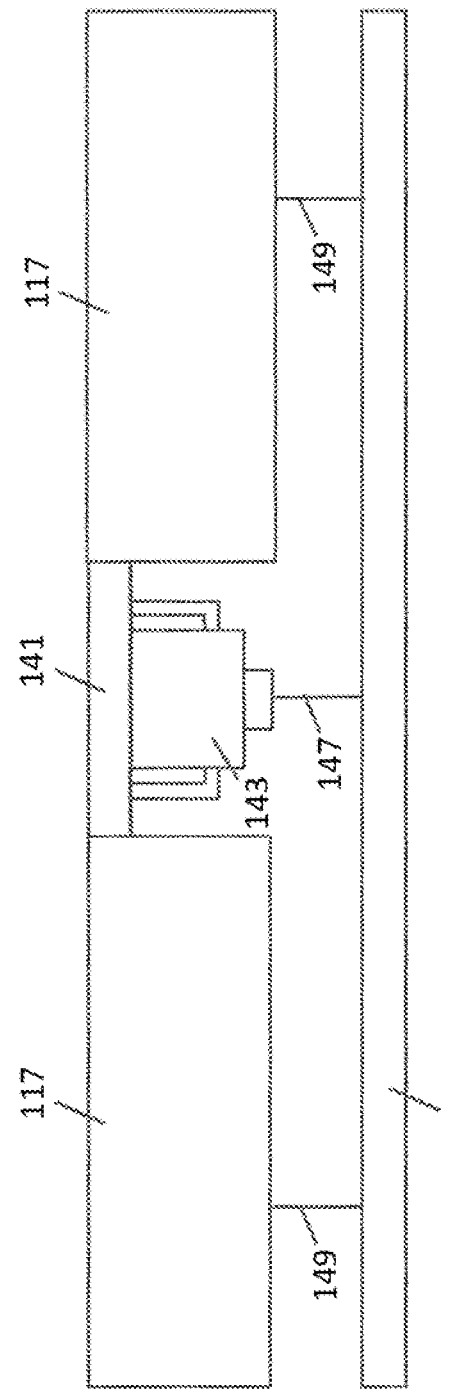
FIG. 9 illustrates a side view of a rack assembly having a carbon dioxide distribution system, a grow lights system and a carbon dioxide sensor system.

With reference to FIG. 9, a front view of another embodiment of the carbon dioxide distribution ducts 117 and grow lights 145 used with the carbon dioxide distribution system 100 is illustrated. In this embodiment, the light bar grow light bar 145 is supported by cables 149 which can be adjustable in length to adjust the height position of the light bar 145. The light bar 145 can be electrically coupled to the ballast 143 with an electrical cable 147.

Figure 10:
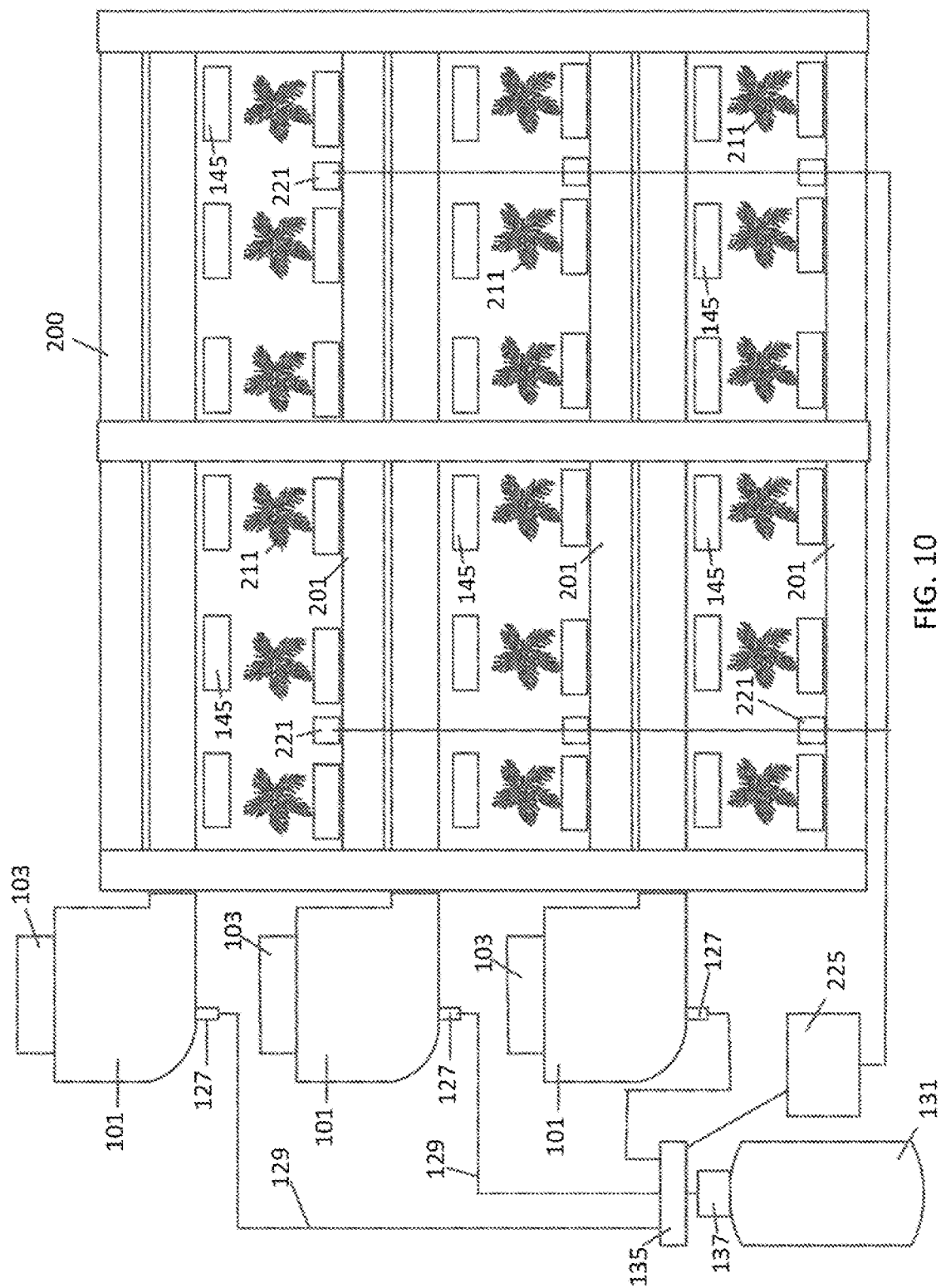
FIG. 10 illustrates a side view of an embodiment of a carbon dioxide distribution system on a rack system.

With reference to FIG. 10, the carbon dioxide distribution system can be used with a rack system 200 that includes a plurality of shelves 201 that provide a plurality of vertically aligned areas for growing plants 211. The ducts 117 of the carbon dioxide distribution systems can be mounted above each of the shelves 201 so that carbon dioxide can be delivered directly to the plants 211. The light bars 145 can also be mounted directly over the plants 211 so that exposure to the grow lights is maximized. An example of a pallet rack 200 is the PiPP mobile storage systems rack shelving system that has two basic components, beams and frames which are assembled to build racks with stacked shelves 201. http://www.pippmobile.com/Products/Shelving-Systems/Pallet-Rack.aspx The carbon dioxide system can be configured to maintain a specific level of carbon dioxide in a grow room. For example, in an embodiment, the system may be configured to maintain the carbon dioxide level at approximately 1,500 ppm. The system can include carbon dioxide sensors 221 coupled to a controller 225 that controls flow control values 135 coupled to the carbon dioxide source 131. By altering the positions of the control valves 135, the flow rates of carbon dioxide to the carbon dioxide distribution systems can be adjusted. The controller 225 can control the flow rate to maintain an optimum carbon dioxide level and prevent the carbon dioxide level from becoming dangerous. When the carbon dioxide level is too high (for example, above, 2,000 ppm), the sensors 221 can detect this excess carbon dioxide and reduce the flow rate of carbon dioxide into the distribution system. Conversely, if the carbon dioxide level is detected as being lower than 1,000 ppm, the controller 225 can open the control vales 135 to increase the carbon dioxide levels through the carbon dioxide distribution system. If the carbon dioxide source 131 is tanks a pressure sensor 137 can be mounted to the tank. If the pressure in the tank drops below a predetermined level, the system can inform the operator that the carbon dioxide tank should be replaced.

If the carbon dioxide level exceeds a level of 3,000, the system can issue a warning indicating that there can be a carbon dioxide control problem and the control system should be inspected. If the carbon dioxide level exceeds a level of 5,000, the system can issue a warning indicating that the carbon dioxide level exceeds the workplace exposure limit and warning people not to enter the room. With reference to Table 1 below a listing of carbon dioxide levels and the human reaction to exposure to the carbon dioxide gas.

TABLE 1

Listing of carbon dioxide levels and human reaction to exposure.

| Carbon Dioxide level | | |
|---|---|---|
| 250-350 ppm | Normal carbon dioxide level in outdoor ambient air | |
| 250-1,000 ppm | Normal carbon dioxide level in indoor air | |
| 1,000-2,000 ppm | Poor quality air and complaints of drowsiness | |
| 2,000-5,000 ppm | Headaches and sleepiness, increased heart rate and nausea. | |
| 5,000+ ppm | Exceeds workplace exposure limit | |

The ducts 117 can run along the length of the rack shelves 201 and the light bars 145 can extend across the width of the shelves 201. In this embodiment, the light bars 145 can be suspended with wires or other supports below the ducts. In other embodiments, the light bars 145 can be mounted directly to the bottom of the ducts 117. In an embodiment, the height of the light bars 145 over the plants 211 can be adjustable. The light bars 145 can be positioned so that the LED lights may be 12-18 inches above the plants 221. As the plants 211 grow, the vertical positions of the light bars 145 may be adjusted to provide the optimum grow light exposure to the plants 211.

The present disclosure, in various embodiments, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the flowing claims reflect, inventive aspects lie in less than all features of any single foregoing disclosed embodiment.

What is claimed is:

1. An apparatus for dispersing air, comprising:
a rack system having a plurality of shelves defining vertically aligned plant growing areas; and
an air system mounted on and supported by the rack system, the air system comprising:
a housing comprising an air inlet portion and an air outlet portion, and defining a plenum between the air inlet and outlet portions, wherein the air inlet portion is positioned laterally outboard of the vertically aligned plant growing areas;
a fan coupled to the air inlet portion of the housing; and
a first elongated duct having a first plurality of holes arranged to direct air at one of the plant growing areas, wherein the first elongated duct has an end coupled to the outlet portion of the housing and extends linearly, and is supported by and along one of the shelves to an opposite end;
wherein the fan directs ambient air in a vertical direction into the housing such that the air flows away from the housing in a horizontal direction through the first elongated duct and through the first plurality of holes in the first elongated duct.

2. The apparatus of claim 1 wherein the first elongated duct has a rectangular cross section that has a width that is greater than a height of the first elongated duct.

3. The apparatus of claim 1 further comprising an intake collar mounted at the inlet portion of the housing.

4. The apparatus of claim 3 wherein the fan is coupled directly to the intake collar and positioned laterally outboard of the vertically aligned plant growing areas.

5. The apparatus of claim 4 wherein the fan, the collar, and the air inlet portion are configured so that air flows downwardly through the fan, the collar, and the air inlet portion.

6. The apparatus of claim 1 further comprising a second elongated duct having a second plurality of holes on a lower surface of the second elongated duct and the second elongated duct has an end coupled to a second outlet portion of the housing, wherein the second elongated duct extends linearly, and is supported by and along the one of the shelves to an opposite end.

7. The apparatus of claim 6, wherein the first elongated duct and second elongated duct define an elongate space therebetween, the elongate space extending uninterrupted from the ends of the first and second elongated ducts to the opposite ends of the first and second elongated ducts.

8. The apparatus of claim 1 further comprising:
a light ballast coupled in proximity to the housing; and
a light bar having a plurality of light emitting diodes, the light bar mounted in proximity to the first elongated duct.

9. The apparatus of claim 1 further comprising a filter positioned between the air inlet portion and the outlet portion of the housing.

10. An apparatus for dispersing air, comprising:
a plurality of vertically stacked shelves having opposite ends each supported by a pair of uprights, the shelves adapted to support plants thereon, at least one of the shelves having an associated air dispersing system comprising:
a housing coupled to and supported by the uprights, the housing having an air inlet portion and an air outlet portion, the housing defining a plenum between the air inlet and outlet portions, and the air inlet portion positioned laterally outboard of the pair of uprights at one of the opposite ends;
a first elongated duct having a first plurality of holes on a lower surface of the first elongated duct and the first elongated duct is coupled to the outlet portion of the housing;
a fan fluidly coupled to the air inlet portion of the housing and which directs ambient air in a vertical direction into the housing such that the air flows away from the housing through the air outlet portion in a horizontal direction, through the first elongated duct, and through the plurality of holes in the first elongated duct.

11. The apparatus of claim 10 wherein the first elongated duct has a rectangular cross section that has a width that is greater than a height of the first elongated duct.

12. The apparatus of claim 10 further comprising an intake collar mounted at the inlet portion of the housing.

13. The apparatus of claim 12 wherein the fan is coupled directly to the intake collar and positioned laterally outboard of the vertically stacked shelves.

14. The apparatus of claim 13, wherein the fan, the collar, and the air inlet portion are configured so that air flows downwardly through the fan, the collar, and the air inlet portion.

15. The apparatus of claim 10 further comprising a second elongated duct having a second plurality of holes on a lower surface of the second elongated duct and the second elongated duct is coupled to a second outlet portion of the housing, wherein the first and second elongated ducts extend linearly and in parallel spaced-apart arrangement along the at least one of the shelves.

16. The apparatus of claim 15, wherein the first and second elongated ducts are positioned at opposite sides of the air inlet portion.

17. The apparatus of claim 16, wherein the first and second elongated ducts define an elongate space extending uninterrupted from ends of the first and second elongated ducts at the housing to the opposite ends of the first and second elongated ducts.

18. The apparatus of claim 10 further comprising:
a light ballast coupled in proximity to the housing; and
a light bar having a plurality of light emitting diodes, the light bar mounted in proximity to the first elongated duct.

19. The apparatus of claim 10, wherein the first elongated duct extends linearly along one of the shelves from an end at the outlet portion of the housing, to an opposite end.

20. The apparatus of claim 10 further comprising a filter positioned between the air inlet portion and the outlet portion of the housing.

21. An apparatus kit for dispersing air, comprising:
a rack system comprising:
a plurality of uprights; and a plurality of shelves that are mountable to the uprights in a vertically stacked arrangement, the shelves defining vertically aligned plant growing areas;

an air system configured to be mounted on and supported by the rack system, the air system comprising:

a housing comprising an air inlet portion and an air outlet portion, the housing defining a plenum between the air inlet and outlet portions, wherein the air inlet portion is configured to be positioned outboard of the vertically aligned plant growing areas;

a fan configured to be coupled to the air inlet portion of the housing; and a first elongated duct having a first plurality of holes arranged to direct air at one of the plant growing areas, wherein the first elongated duct has an end configured for coupling to the outlet portion of the housing, and is configured to extend linearly along and be supported by at least one of the shelves to an opposite end;

wherein the fan is operable to direct ambient air in a vertical direction into the housing such that the air flows away from the housing in a horizontal direction through the first elongated duct and through the first plurality of holes in the first elongated duct.

22. The apparatus kit of claim 21, wherein the first plurality of holes is arranged along a lower surface of the first elongated duct so that air flows downwardly out through the first plurality of holes.

23. The apparatus kit of claim 22, further comprising a second elongated duct having a second plurality of holes on a lower surface of the second elongated duct, and the second elongated duct is configured for coupling to a second outlet portion of the housing.

24. The apparatus kit of claim 21 further comprising a filter configured to be positioned between the air inlet portion and the outlet portion of the housing.

25. A vertical plant growing system comprising:

a rack having opposed ends and elongate sides extending between the ends, the rack comprising:

a plurality of uprights; and at least an upper shelf and a lower shelf supported by the uprights and disposed in vertically spaced stacked arrangement to define at least upper and lower plant growing regions, wherein the uprights are disposed along sides of the rack; and upper and lower air distribution systems supported by the rack, wherein each of the air distribution systems comprises a fan, a housing, and an elongated duct, wherein the fan and the elongated duct are fluidly coupled to the housing;

wherein the elongated duct of the upper air distribution system extends along the rack between selected ones of the uprights and is disposed above the upper shelf, and the elongated duct of the lower air distribution system extends along the rack between the selected ones of the uprights and is disposed beneath the upper shelf and above the lower shelf; and wherein the elongated ducts of the upper and lower air distribution systems each include a plurality of apertures whereby air provided by the fans to the housings flows through the elongated ducts and is discharged out of the apertures toward the upper and lower shelves, respectively.

26. The vertical plant growing system of claim 25, wherein the fans are attached to inlet portions of the housings, and the elongated ducts comprise ends attached to outlet portions of the housings and opposite ends located opposite the fans and the housings, the elongated ducts defining straight flow paths from the ends to the opposite ends.

27. The vertical plant growing system of claim 25 wherein the housing comprises an air inlet portion and an air outlet portion, wherein the air inlet portion is positioned laterally outboard of the upper and lower plant growing regions.

28. The vertical plant growing system of claim 27 further comprising a filter positioned between the air inlet portion and the outlet portion of the housing.

29. A vertical plant growing system comprising:

a rack having opposed ends and elongate sides extending between the ends, the rack comprising:

a plurality of uprights; and at least two plant shelves that are each configured to support plants, wherein the plant shelves are supported by the uprights with the uprights disposed at the sides of the rack, and with the plant shelves disposed in vertically spaced stacked arrangement with respect to each other;

upper and lower air distribution systems attached to and supported by the rack in vertically spaced stacked arrangement with respect to each other, wherein each air distribution system comprises a fan, a housing, and an elongated duct, wherein the fan and the elongated duct are fluidly coupled to the housing;

wherein the elongated ducts of the air distribution systems define respective straight flow paths and extend along the rack between selected ones of the uprights and are each disposed above separate ones of the plant shelves; and wherein the elongated duct of the lower air distribution system is disposed beneath one of the plant shelves and the elongated duct of the upper air distribution system is disposed above the one of the plant shelves.

30. The vertical plant growing system of claim 29 wherein the elongated duct of the lower air distribution system is supported by the one of the plant shelves and the elongated duct of the upper air distribution system is supported by another of the plant shelves.

31. The vertical plant growing system of claim 29 wherein the housings comprise air inlet portions and an air outlet portions, wherein the air inlet portions are positioned laterally outboard of the plant shelves.

32. The vertical plant growing system of claim 29, wherein the fans are positioned laterally outboard of the plant shelves.

33. The vertical plant growing system of claim 29 further comprising a filter positioned between the air inlet portion and the outlet portion of the housing.

* * * * *

(12) EX PARTE REEXAMINATION CERTIFICATE (248th)
Ex Parte Reexamination Ordered under 35 U.S.C. 257

United States Patent
Bogner et al.

(10) Number: US 11,641,810 C1
(45) Certificate Issued: Nov. 14, 2024

(54) SYSTEM FOR PROVIDING CIRCULATING AIR FOR A VERTICAL GARDENING SYSTEM

(71) Applicant: Vertical Air Solutions LLC, Aptos, CA (US)

(72) Inventors: Matthew Lawrence Bogner, Watsonville, CA (US); James Allen Cunningham, Aptos, CA (US)

(73) Assignee: VERTICAL AIR SOLUTIONS LLC, Aptos, CA (US)

Supplemental Examination Request:
No. 96/050,037, Apr. 11, 2024

Reexamination Certificate for:
Patent No.: 11,641,810
Issued: May 9, 2023
Appl. No.: 16/892,595
Filed: Jun. 4, 2020

Related U.S. Application Data

(63) Continuation of application No. 15/730,659, filed on Oct. 11, 2017, now Pat. No. 10,694,682.

(60) Provisional application No. 62/549,919, filed on Aug. 24, 2017.

(51) Int. Cl.
*A01G 9/18* (2006.01)
*A01G 9/20* (2006.01)
*A01G 9/24* (2006.01)

(52) U.S. Cl.
CPC .............. *A01G 9/18* (2013.01); *A01G 9/24* (2013.01); *A01G 9/246* (2013.01); *A01G 9/249* (2019.05); *A01G 9/20* (2013.01)

(58) Field of Classification Search
None
See application file for complete search history.

(56) References Cited

To view the complete listing of prior art documents cited during the supplemental examination proceeding and the resulting reexamination proceeding for Control Number 96/050,037, please refer to the USPTO's Patent Electronic System.

*Primary Examiner* — Terrence R Till

(57) ABSTRACT

Vertical growing uses a plurality of shelves to support plants. The system provides nitrogen and light to help grow the plants placed on the shelves. The system also circulates air that is filtered and mixed with the nitrogen before being distributed to the plants. The filters can remove odors from the circulating air.

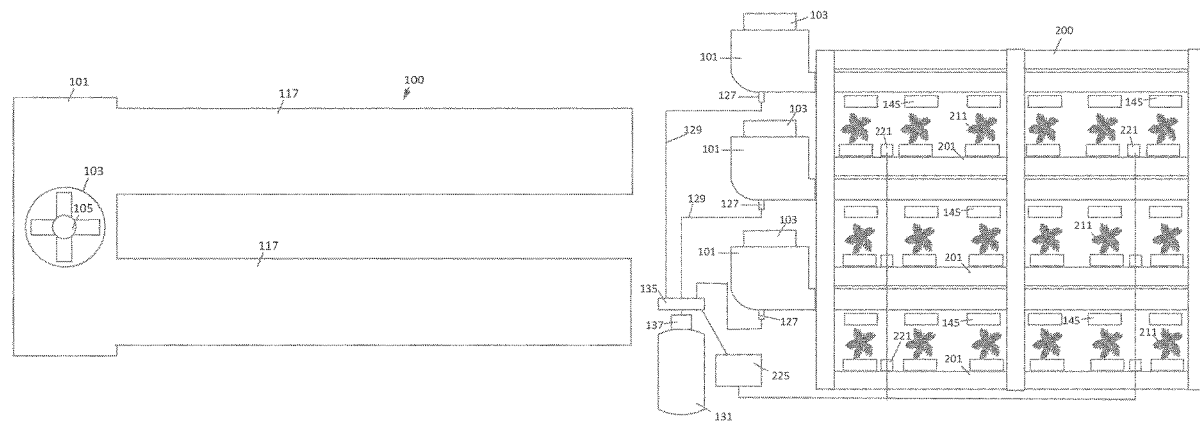

US 11,641,810 C1

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4-7, 13-17, 23 and 26 is confirmed.

Claims 1, 3, 10, 12, 21, 22, 25 and 29 are cancelled.

Claims 2, 8, 9, 11, 18-20, 24, 27 and 30-33 are determined to be patentable as amended.

Claim 28, dependent on an amended claim, is determined to be patentable.

New claims 34-52 are added and determined to be patentable.

2. The apparatus of claim [1] *34*, wherein the first elongated duct has a rectangular cross section that has a width that is greater than a height of the first elongated duct.

8. The apparatus of claim [1] *34*, further comprising:
a light ballast coupled in proximity to the housing; and
a light bar having a plurality of light emitting diodes, the light bar mounted in proximity to the first elongated duct.

9. The apparatus of claim [1] *34*, further comprising a filter positioned between the air inlet portion and the outlet portion of the housing.

11. The apparatus of claim [10] *38*, wherein the first elongated duct has a rectangular cross section that has a width that is greater than a height of the first elongated duct.

18. The apparatus of claim [10] *38*, further comprising:
a light ballast coupled in proximity to the housing; and
a light bar having a plurality of light emitting diodes, the light bar mounted in proximity to the first elongated duct.

19. The apparatus of claim [10] *38*, wherein the first elongated duct extends linearly along one of the shelves from an end at the outlet portion of the housing, to an opposite end.

20. The apparatus of claim [10] *38*, further comprising a filter positioned between the air inlet portion and the outlet portion of the housing.

24. The apparatus kit of claim [21] *41*, further comprising a filter configured to be positioned between the air inlet portion and the outlet portion of the housing.

27. The vertical plant growing system of claim [25] *46*, wherein the housing comprises an air inlet portion and an air outlet portion, wherein the air inlet portion is positioned laterally outboard of the upper and lower plant growing regions.

30. The vertical plant growing system of claim [29] *50*, wherein the elongated duct of the lower air distribution system is supported by the one of the plant shelves and the elongated duct of the upper air distribution system is supported by another of the plant shelves.

31. The vertical plant growing system of claim [29] *50*, wherein the housings comprise air inlet portions and an air outlet portions, wherein the air inlet portions are positioned laterally outboard of the plant shelves.

32. The vertical plant growing system of claim [29] *50*, wherein the fans are positioned laterally outboard of the plant shelves.

33. The vertical plant growing system of claim [29] *50*, further comprising a filter positioned between the air inlet portion and the outlet portion of the housing.

*34. The apparatus of claim 1, wherein the fan is located outside of the housing wherein the air flows from the fan into the air inlet portion of the housing.*

*35. The apparatus of claim 34, wherein the fan is operable to blow the air vertically into the air inlet portion of the housing.*

*36. The apparatus of claim 34, wherein the housing is located laterally outside of the rack system.*

*37. The apparatus of claim 34, wherein the housing comprises a plenum between the air inlet portion and the air outlet portion, and the fan blows air into the air inlet portion wherein air flows into the plenum.*

*38. The apparatus of claim 10, wherein the fan is located outside of the housing wherein the air flows from the fan into the air inlet portion of the housing.*

*39. The apparatus of claim 38, wherein the fan is operable to blow the air vertically into the inlet portion of the housing.*

*40. The apparatus of claim 38, wherein the plurality of vertically stacked shelves and the pair of uprights form a rack, the housing being located laterally outside of the rack.*

*41. The apparatus kit of claim 21, wherein the fan is located outside of the housing wherein the air flows from the fan into the air inlet portion of the housing.*

*42. The apparatus kit of claim 41, wherein the fan is operable to blow air vertically into the air inlet of the housing.*

*43. The apparatus kit of claim 41, wherein the housing is located laterally outside of the rack system.*

*44. The apparatus kit of claim 41, wherein the fan is operable to blow air into the air inlet portion wherein air flows into the plenum.*

*45. The apparatus kit of claim 41, wherein the first plurality of holes is arranged along a lower surface of the first elongated duct so that air flows downwardly out through the first plurality of holes.*

*46. The vertical plant growing system of claim 25, wherein each fan is located outside of its respective housing wherein the air flows from the fans into the respective housings.*

*47. The vertical plant growing system of claim 46, wherein each fan is operable to blow air vertically into its respective housing.*

*48. The vertical plant growing system of claim 46, wherein the housings are located laterally outside of the rack.*

*49. The vertical plant growing system of claim 46, wherein each housing comprises an air inlet portion, an outlet portion, and a plenum between the respective air inlet portion and the respective air outlet portion, and the fans being operable to blow air into the respective air inlet portions wherein air flows into the respective plenums of the housings.*

*50. The vertical plant growing system of claim 29, wherein each fan is located outside of its respective housing wherein the air flows from the fans into the respective housings.*

*51. The vertical plant growing system of claim 50, wherein the fans are operable to blow air vertically into the respective housings.*

52. The vertical plant growing system of claim 50, wherein the housings are located laterally outside of the rack.

\* \* \* \* \*